(12) United States Patent
Banerjea et al.

(10) Patent No.: US 8,867,481 B2
(45) Date of Patent: Oct. 21, 2014

(54) WLAN CHANNEL ALLOCATION

(75) Inventors: Raja Banerjea, Sunnyvale, CA (US); Hongyuan Zhang, Fremont, CA (US); Paul Lambert, Mountain View, CA (US)

(73) Assignee: Marvell World Trade Ltd, St. Michael (BB)

( * ) Notice: Subject to any disclaimer, the term of this patent is extended or adjusted under 35 U.S.C. 154(b) by 91 days.

(21) Appl. No.: 13/369,102

(22) Filed: Feb. 8, 2012

(65) Prior Publication Data

US 2012/0207106 A1 Aug. 16, 2012

Related U.S. Application Data

(60) Provisional application No. 61/440,814, filed on Feb. 8, 2011, provisional application No. 61/443,185, filed on Feb. 15, 2011, provisional application No. 61/444,590, filed on Feb. 18, 2011, provisional application No. 61/451,310, filed on Mar. 10, 2011.

(51) Int. Cl.
*H04W 4/00* (2009.01)
*H04W 72/04* (2009.01)

(52) U.S. Cl.
CPC .................. *H04W 72/044* (2013.01)
USPC .......................... 370/330; 370/343

(58) Field of Classification Search
USPC ......... 370/281, 319, 322, 329, 341, 344, 436, 370/330
See application file for complete search history.

(56) References Cited

U.S. PATENT DOCUMENTS

| | | | |
|---|---|---|---|
| 4,310,856 A * | 1/1982 | Poetsch | 348/97 |
| 4,740,831 A * | 4/1988 | Rhodes | 348/384.1 |
| 6,721,018 B1 * | 4/2004 | Shintani et al. | 348/731 |
| 7,440,391 B2 * | 10/2008 | Geile et al. | 370/203 |
| 2002/0159513 A1 * | 10/2002 | Williams et al. | 375/222 |
| 2005/0159109 A1 * | 7/2005 | Kivekas et al. | 455/67.11 |
| 2006/0217098 A1 * | 9/2006 | Anderson et al. | 455/255 |
| 2007/0201503 A1 | 8/2007 | Nishio | |
| 2007/0218851 A1 * | 9/2007 | Soe et al. | 455/209 |
| 2008/0020791 A1 * | 1/2008 | Ito et al. | 455/516 |

(Continued)

FOREIGN PATENT DOCUMENTS

WO WO-98/37703 A2 8/1998
WO WO-2012/122119 A1 9/2012

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

(Continued)

*Primary Examiner* — Gary Mui
*Assistant Examiner* — Kabir Jahangir

(57) ABSTRACT

In a method available frequency band for communication is determined and a frequency $f_c$ of a carrier is determined based on the available frequency band. The carrier is set to the frequency $f_c$ for communicating with one or more communication devices via a first communication channel within the available frequency band using. After communicating via the first communication channel, the carrier frequency $f_c$ is used for communicating with one or more communication devices via a second communication channel within the available bandwidth. A center frequency of the first channel is different than a center frequency of the second channel.

14 Claims, 15 Drawing Sheets

(56) References Cited

U.S. PATENT DOCUMENTS

| | | |
|---|---|---|
| 2008/0273479 A1 | 11/2008 | Kwak et al. |
| 2009/0196163 A1 | 8/2009 | Du |
| 2012/0163309 A1 | 6/2012 | Ma et al. |
| 2012/0201213 A1 | 8/2012 | Banerjea et al. |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.,* (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.,* Nov. 7, 2001.

IEEE Std 802.11g/D8.2, Apr 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.,* Apr. 2003.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.,* Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.,* Oct. 2009.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Partial International search Report for International Application No. PCT/US2012/024351, dated Jul. 2, 2012.

International Search Report and Written Opinion for International Application No. PCT/US2012/024351, mailed Sep. 7, 2013.

International Preliminary Report on Patentability in corresponding Application No. PCT/US2012/024351, mailed Aug. 22, 2013.

International Standard, ISO/IEC 8802-11, ANSI/IEEE Std 802.11, "Information technology—Telecommunications and information exchange between systems—local and metropolitan are networks—specific requirements" Part 11: Wireless LAN Medium Access Control (MAC) and Physical Layer (PHY) specifications, *The Institute of Electical and Electronics Engineers, Inc.,* (1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.,* 23 pages, Nov. 7.2001.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band,"*The Institute of Electrical and Electronics Engineers, Inc.,* May 2002.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.,* (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.,* doc.: IEEE 802.11-04/0889r6, May 2005.

van Nee, et al. "The 802.11n MIMO-OFDM Standard for Wireless LAN and Beyond," Wireless Personal Communications, vol. 37, pp. 445-453 (Jun. 2006).

Stacey et al., "Specification Framework for TGac," document No. IEEE 802.11-09/0992r20, *Institute for Electrical and Electronics Engineers,* pp. 1-49, Jan. 18, 2011.

IEEE Std 802.11 ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.,* Jan. 2012.

Perahia, et al., "Gigabit Wireless LANs: an overview of IEEE 802.11ac and 80211ad," ACM Sigmobile Mobile Computing and Communications Review, vo. 15, No. 3, pp. 23-33, Jul. 2011.

Cariou et al., "Multi-channel Transmissions," Doc. No. IEEE 802.11-09/1022r0, *The Institute of Electrical and Electronics Engineers, Inc.,* Sep. 2009.

Yuan et al., "Carrier Aggregation for LTE-Advanced Mobile Communication Systems," IEEE Communications Magazine, pp. 88-93, Feb. 2010.

Pedersen et al., "Carrier Aggregation for LTE-Advanced: Functionality and Performance Aspects," IEEE Communications Magazine, vol. 49, No. 6, pp. 89-95, Jun. 1, 2011.

Noh, et al., "Channel Selection and Management for 11 ac," Doc. No. IEEE 802.11-10/0593r1, *The Institute of Electrical and Electronics Engineers, Inc.,* May 20, 2010.

Redieteab, et al., "Cross-Layer Multichannel Aggregation for Future WLAN Systems," 2010 IEEE Int'l Conf. on Communication Systems (ICCS), pp. 740-745, Nov. 2010.

Park, "IEEE 802.11ac: Dynamic Bandwidth Channel Access," 2011 IEEE Int'l Conf. on Communications (ICC), pp. 1-5, Jun. 2011.

Liu, et al., "VHT BSS Channel Selection," *Institute of Electrical and Electronics Engineers, Inc.,* doc. No. IEEE 802.11-11/1433r0 (Nov. 2011).

(56) References Cited

OTHER PUBLICATIONS

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.,* Nov. 2011.

Yu, et al. "Coverage extension for IEEE802.11ah," *The Institute of Electrical and Electronics Engineers,* doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers,* pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Zhang et al., "11 ah Data Transmission Flow," *The Institute of Electrical and Electronics Engineers,* doc. No. IEEE 802.11-11/1484r1, (Nov. 2011).

Vermani, et al. "Preamble Format for 1 MHz," *The Institute of Electrical and Electronics Engineers,* doc. No. IEEE 802.11-11/1482r2, (Nov. 2011).

Vermani, et al. "Spec Framework Text for PHY Numerology," *The Institute of Electrical and Electronics Engineers,* doc. No. IEEE 802.11-11/1311r0, (Sep. 2011).

IEEE Std 802.11h™-2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," *The Institute of Electrical and Electronics Engineers, Inc.,* Oct. 14, 2003; 75 pages.

Office Action in U.S. Appl. No. 13/402,869, mailed Mar. 6, 2014.

\* cited by examiner

FIG. 6

| Channel start Frequency (MHz) | Channel Number Multiplier (MHz) | Channel BW (MHz) | Channel Number |
|---|---|---|---|
| 450 | 10 | 40 | 5,9,13,21 |
| 455 | 10 | 20 | 4,6,8,10,12,14,20,22 |
| 450 | 1 | 10 | 3,4,...14;19,20,21,22 |
| | | 5 | 23,29...155;167,173...197 |
| | | 10 | 26,32,38...152;170,200 |
| 450 | 1 | 10 (10 in 20) | 35,40,55,65,75,85... |
| 450 | 0.5 | 5 (5 in 20) | 65,75,85,105,115... |
| 450 | 0.5 | 5 (5 in 10) | 47,57,59,69,71,81... |
| 450 | 1 | 5 | 23,29...155;167,173...197 |
| | | 10 | 26,32...152;170,200 |

| Channel Bandwidth (MHz) | Symbol Duration (μs) | FFT Size | Inter-Carrier Spacing (kHz) | Short/Long Guard Interval (μs) | Min. Throughput (Mbps) |
|---|---|---|---|---|---|
| 40 | 4 | 128 | 312.5 | 0.8/0.4 | 13 |
| 20 | 4 | 64 | 312.5 | 0.8/0.4 | 6.5 |
| 10 | 16 | 128 | 78.125 | 3.2/1.6 | 3.25 |
| 5 | 16 | 64 | 78.125 | 3.2/1.6 | 1.625 |

| Channel Bandwidth (MHz) | Symbol Duration (μs) | FFT Size | Inter-Carrier Spacing (kHz) | Short/Long Guard Interval (μs) | Min. Throughput (Mbps) |
|---|---|---|---|---|---|
| 40 | 16 | 512 | 78.125 | 3.2/1.6 | 14.625 |
| 20 | 16 | 256 | 78.125 | 3.2/1.6 | 7.3125 |
| 10 | 16 | 128 | 78.125 | 3.2/1.6 | 3.25 |
| 5 | 16 | 64 | 78.125 | 3.2/1.6 | 1.625 |

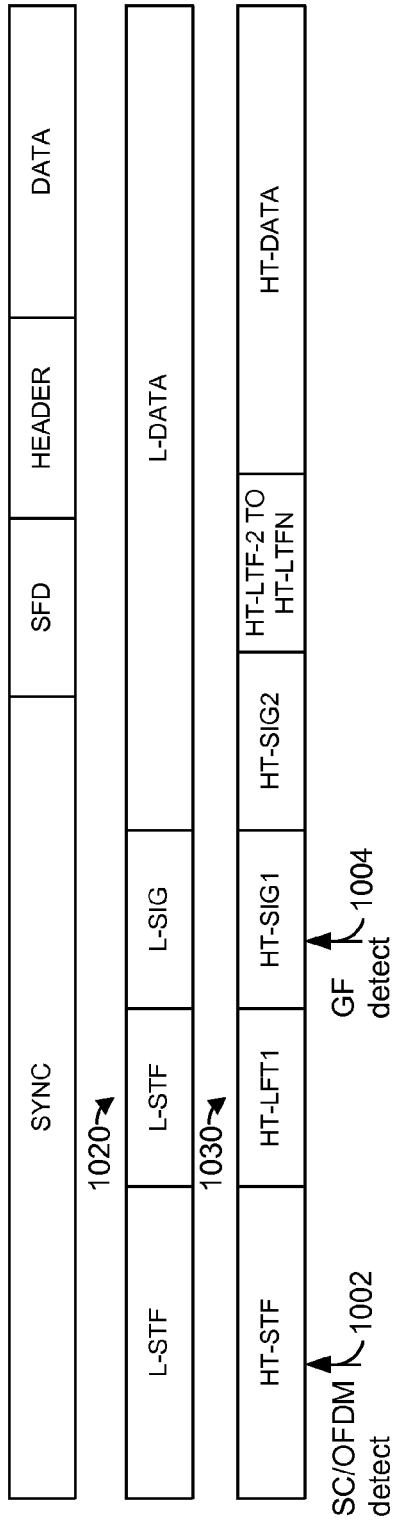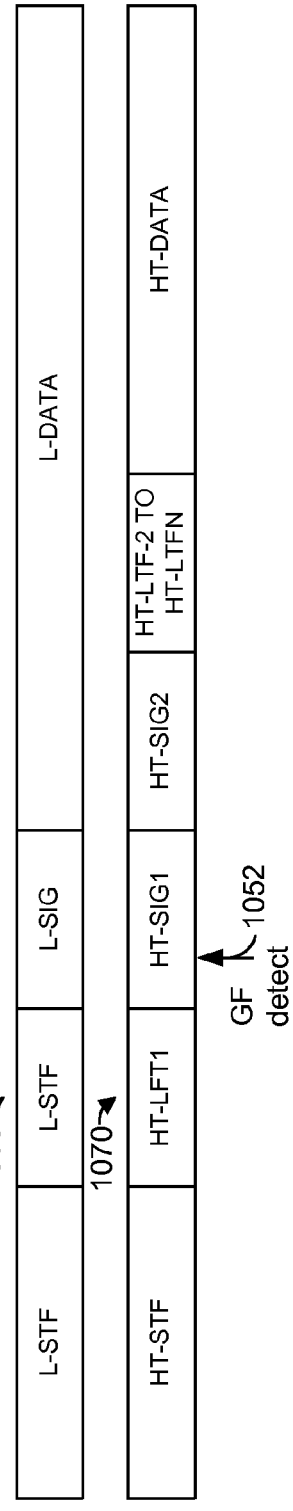
FIG. 10A
FIG. 10B

WLAN CHANNEL ALLOCATION

CROSS-REFERENCES TO RELATED APPLICATIONS

This disclosure claims the benefit of the following U.S. Provisional Patent Applications:

U.S. Provisional Patent Application No. 61/440,814, entitled "IEEE 802.11af," filed on Feb. 8, 2011;

U.S. Provisional Patent Application No. 61/443,185, entitled "IEEE 802.11af," filed on Feb. 15, 2011;

U.S. Provisional Patent Application No. 61/444,590, entitled "Dynamic Channel Allocation," filed on Feb. 18, 2011; and U.S. Provisional Patent Application No. 61/451,310, entitled "Dynamic Channel Allocation," filed on Mar. 10, 2011.

The disclosures of all of the above-referenced patent applications are hereby incorporated by reference herein in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11ah and IEEE 802.11af, each of which will specify wireless network operation in sub-1 GHz frequencies. Lower frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub 1-GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method includes determining available frequency band for communication and determining a frequency $f_c$ of a carrier based on the available frequency band. The method also comprises communicating with one or more communication devices via a first communication channel within the available frequency band using the carrier set to the frequency $f_c$. The method further comprises, after communicating via the first communication channel, communicating with one or more communication devices via a second communication channel within the available bandwidth using the carrier set to the frequency $f_c$, wherein a center frequency of the first channel is different than a center frequency of the second channel.

In another embodiment, an apparatus comprises a network interface configured to determine an available frequency band for communication. The network interface is also configured to determine a frequency $f_c$ of a carrier based on the available frequency band. The network interface is further configured to communicate with one or more communication devices via a first communication channel within the available frequency band using the carrier set to the frequency $f_c$. The network interface is further still configured to, after communicating via the first communication channel, communicate with one or more communication devices via a second communication channel within the available bandwidth using the carrier set to the frequency $f_c$, wherein a center frequency of the first channel is different than a center frequency of the second channel.

In yet another embodiment, a method comprises determining an available frequency band for communication and determining a frequency $f_{LO}$ of a local oscillator based on the available frequency band. The method also comprises communicating with one or more communication devices via a first communication channel within the available frequency band including using the local oscillator set to the frequency $f_{LO}$ to upconvert to or downconvert from the first communication channel. The method further comprises, after communicating via the first communication channel, communicating with one or more communication devices via a second communication channel within the available bandwidth including using the local oscillator set to the frequency $f_{LO}$ to upconvert to or downconvert from the second communication channel.

In yet another embodiment, an apparatus comprises a network interface configured to determine an available frequency band for communication. The network interface is also configured to determine a frequency $f_{LO}$ of a local oscillator based on the available frequency band. The network interface is further configured to communicate with one or more communication devices via a first communication channel within the available frequency band including using the local oscillator set to the frequency $f_{LO}$ to upconvert to or downconvert from the first communication channel. The network interface is further still configured to, after communicating via the first communication channel, communicate with one or more communication devices via a second communication channel within the available bandwidth including using the local oscillator set to the frequency $f_{LO}$ to upconvert to or downconvert from the second communication channel.

In yet another embodiment, a method comprises determining an available frequency band for communication and determining, based on the available frequency band, a subset of communication channels from possible communication channels within the available frequency band. The method also comprises selecting a communication channel from the subset of communication channels. The method further comprises utilizing the selected communication channel to communicate with one or more communication devices.

In yet another embodiment, an apparatus comprises a network interface configured to determine an available frequency band for communication. The network interface is also configured to determine, based on the available frequency band, a subset of communication channels from possible communication channels within the available frequency band. The network interface is further configured to select a communication channel from the subset of communication channels. The network interface is further still configured to utilize the selected communication channel to communicate with one or more communication devices.

In yet another embodiment, a method comprises transmitting, with a first communication device and to a second communication device, an indication of a location of the first communication device. The method also comprises, in response to transmitting the indication of the location of the first communication device, receiving from the second communication device an indication of a set of communication channels for use by the first communication device. The method further comprises selecting, with the first communication device, a communication channel from the set of communication channels. The method further still comprises utilizing the selected communication channel to communicate with at least a third communication device.

In yet another embodiment, a first communication device comprises a network interface configured to transmit, to a second communication device, an indication of a location of the first communication device. The network interface is also configured to, in response to transmitting the indication of the location of the first communication device, receive from the second communication device an indication of a set of communication channels for use by the first communication device. The network interface is further configured to select a communication channel from the set of communication channels. The network interface is further still configured to utilize the selected communication channel to communicate with at least a third communication device.

BRIEF DESCRIPTION OF THE DRAWINGS

FIG. 6 is a Table illustrating various channelization schemes corresponding to various operating classes used in various embodiments and/or scenarios.

FIG. 9A is a Table illustrating example physical layer (PHY) data unit parameters, according to an embodiment.

FIG. 9B is a Table illustrating example PHY data unit parameters, according to an embodiment.

FIGS. 10A and 10B illustrate data units generated using a down-clocked clock rate and a regular short range clock rate, respectively, according to an embodiment.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub 1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiment, the AP is also configured to operate with client stations according to one or more other communication protocols which define operation in generally higher frequency ranges and are typically used for communication in closer ranges and with generally higher data rates. The closer range communication protocols are collectively referred to herein as "short range" communication protocols.

In some embodiments, the long range communication protocol defines one or more physical layer data unit formats the same as or similar to physical layer data unit format defined by one or more of the short range communication protocols. In one embodiment, to support communication over a longer range, and also to accommodate typically smaller bandwidth channels available at lower (sub 1-GHz) frequencies, the long range communication protocol defines data units having a format that is substantially the same as a physical layer data unit format defined by a long range communication protocol, but generated using a lower clock rate. In an embodiment, the AP operates at a clock rate suitable for short range (and high throughput) operation, and down-clocking is used to generate a new clock signal to be used for the sub 1 GHz operation. As a result, in this embodiment, a data unit that conforms to the long range communication protocol ("long range data unit") maintains a physical layer format of a data unit that generally conforms to a short range communication protocol ("short range data unit"), but is transmitted over a longer period of time. On the other hand, in some embodiments, the long range communication protocol supports at least one channel bandwidth that is also supported by a long range communication protocol. In this case, a short range data unit for such channel is generated using the same clock rate as the clock rate used for generating long range data units. Accordingly, in some embodiments, the long range communication protocol defines a number of different clock rates to be used for generating data units that are transmitted in different channel bandwidths (e.g., a clock rate corresponding to a short range communication protocol for one or more supported channel bandwidths, and a down-clocked clock rate for one or more other supported channel bandwidths).

Figure 1:
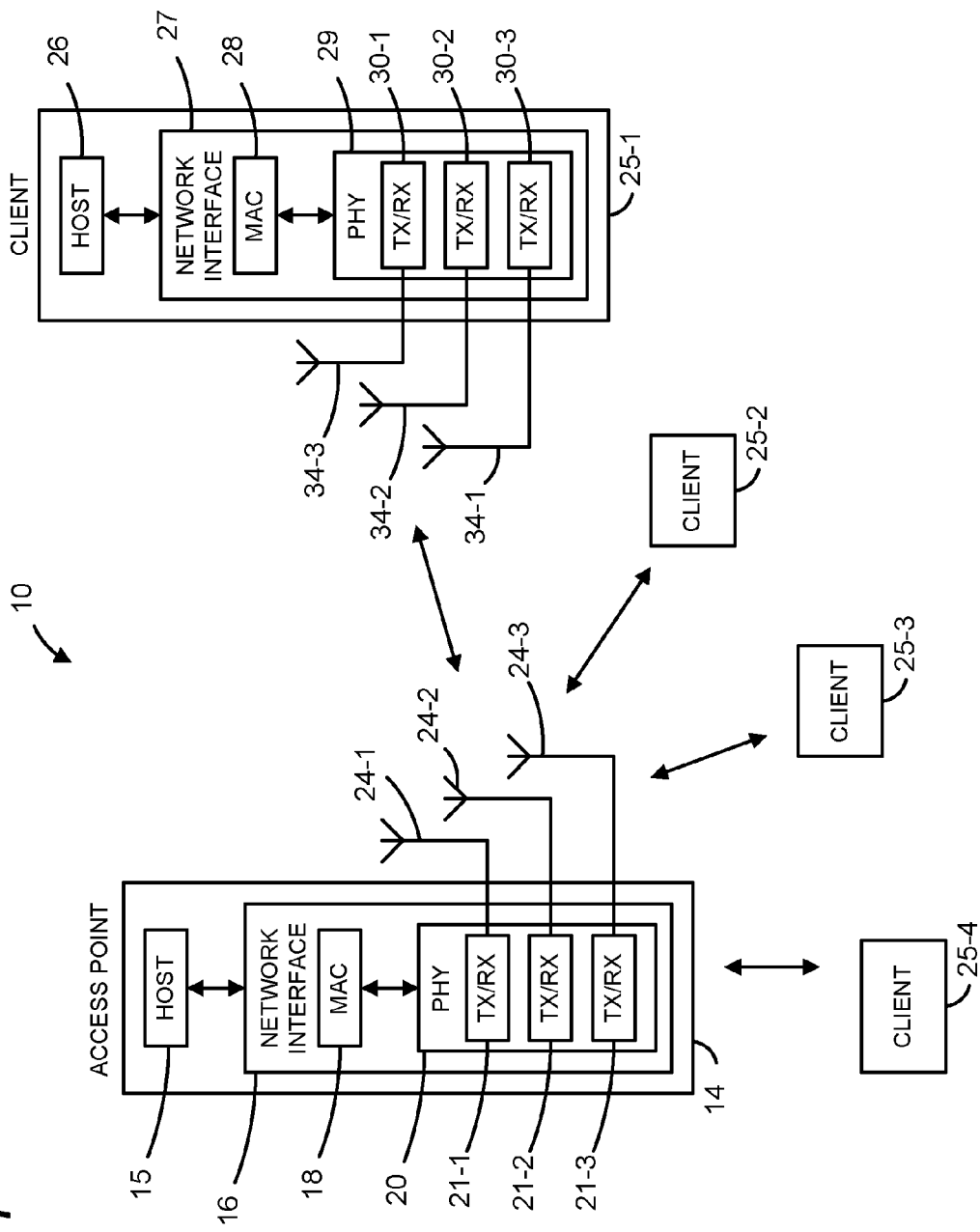
FIG. 1 is a block diagram of an example wireless local area network (WLAN), according to an embodiment.

In various embodiments, the AP transmits long range data units in an unused frequency band within a frequency spectrum allocated for television (TV) transmission. Accordingly, the long range communication protocol needs to channelize unused TV space to accommodate various supported WLAN channel bandwidths. However, in an embodiment, the particular TV channels ("TV channel slots") that are available for WLAN transmission vary at different times and in different geographical locations. In some embodiments, channelization is defined dynamically based on, for example, the specific frequency ranges available for WLAN communication. FIG. 1 is a block diagram of an example wireless local area network (WLAN) 10 including an AP 14, according to an embodiment. The AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate according to one or more of the short range communication protocols.

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY unit 20 of the AP 14 is configured to process received data units conforming to the long range communication protocol and having formats described hereinafter, according to various embodiments.

In various embodiments, the PHY unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the long range communication protocol and having formats described hereinafter, according to various embodiments.

According to an embodiment, the AP 14 transmits long range data units in an available portion of licensed TV frequency band.

In various embodiments, an AP (e.g., the AP 14) operates in unused portions of TV broadcasting spectrum, sometimes referred to herein as "TV white spaces" or "TVWS". As indicated above, the particular bandwidth and frequency location of TVWS available for WLAN communication typically depends on the time of day and/or the geographical location in which the AP operates. Thus, for example, when the AP's geographical location changes (as the AP moves form one area to another, for example) and/or as the time of day changes, the available sub-GHz band in which the AP can operate, in some situations, changes as well. Typically, a TV channel occupies a certain predetermined bandwidth (e.g., 6 MHz in the United States, 8 MHz in Europe, etc.) and, accordingly, a contiguous frequency band within the TV broadcasting band available for an unlicensed WLAN communication device is a multiple of the predetermined bandwidth (e.g., 6 MHz, 12 MHz, 18 MHz, etc.). On the other hand, in various embodiments and/or scenarios, long range data units specified by the long range communication protocol occupy a 5 MHz, a 10 MHz, a 20 MHz, or a 40 MHz bandwidth channels. Therefore, a channelization scheme defined for WLAN communication within TVWS frequency bands generally needs to define placement of smaller communication channels in larger TVWS frequency bands. In an embodiment, channelization is defined such that smaller WLAN channels are transmitted in larger TV white spaces in a number of non-overlapping channel sets, wherein each set includes one or more larger channels and one or more smaller channels, where each larger channel is made up of two or more contiguous channels corresponding to the smaller bandwidth. According to an embodiment, the specific center frequency of a particular WLAN channel depends on the amount of TVWS available for WLAN transmission. As an example, in an embodiment, a center frequency of a 5 MHz communication channel is defined differently with respect to the available frequency band based on the particular bandwidth of the available band. In another embodiment, a channelization scheme defines a number of suitable channel maps corresponding to various suitable placements of various WLAN channels in various available TV channel ranges, and a channel map is then selected based on the amount of TV spectrum available for WLAN transmission.

According to an embodiment, the long range communication protocol defines specific 5 MHz, 10 MHz, 20 MHz, 40 MHz WLAN channels within TV spectrum via a number of "operating classes." In an embodiment, each operating class includes a number of communication channels defined by a starting frequency (e.g., 156 MHz, 450 MHz, 455 MHz, 650 MHz or another suitable starting frequency within the sub-GHz frequency range), a channel multiplier number, a channel spacing, and a channel number within the operating class. For convenience, TV spectrum corresponding to operating classes having a starting frequency of 156 MHz is sometimes referred to herein as "156 MHz TV channel spectrum". Similarly, TV spectrum corresponding to operating classes having a starting frequency of 450 MHz or 455 MHz is sometimes referred to herein as "450 MHz TV channel spectrum."

To this end, in an embodiment, an AP acquires (e.g., through carrier sensing, through communication with a central data base, etc.) information regarding particular TV channels that are available for WLAN transmissions and determines or selects a particular channelization scheme that defines one or more communication channels be used for WLAN transmissions within the available TV band. In some embodiments, the long range communication protocol defines different channel center frequencies based on the available bandwidth (e.g., determined by the number of contiguous unused TV channels). Accordingly, in one such embodiment, the AP determines a channel center frequency upon determining the number of available TV channels.

To determine an available frequency band within the licensed TV spectrum, according to one embodiment, the AP 14 utilizes a carrier sensing technique to determine which TV channels are idle and available for WLAN transmission. In other words, in this embodiment, the AP 14 scans the TV frequency spectrum or a portion thereof and determines which frequency band or bands the AP 14 can utilize for communicating with one or more of the client stations 25 based on the results of the scan.

Figure 2:
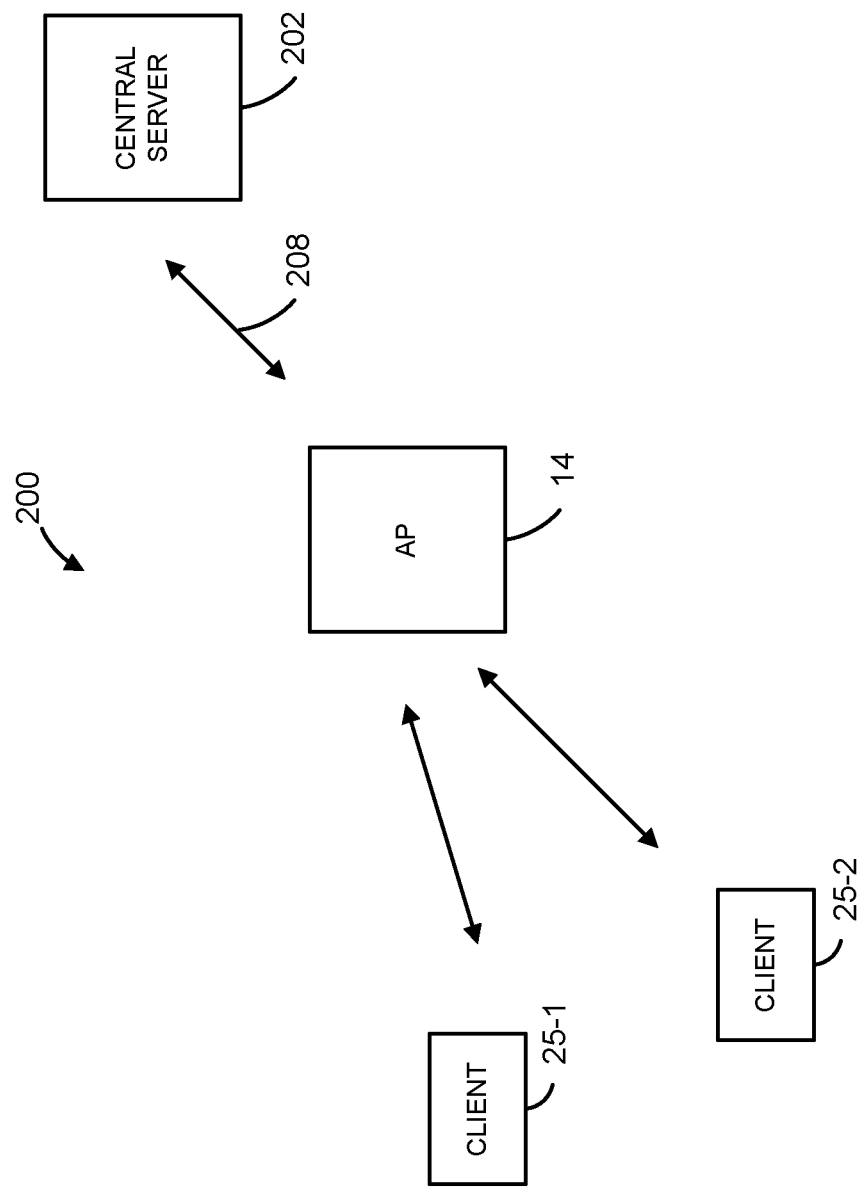
FIG. 2 is a block diagram of an example WLAN which includes a communication device capable of providing information regarding TV white spaces, according to an embodiment.

In another embodiment, the AP 14 communicates with a central database, a central server, or with another communication device capable of providing information regarding TV frequency spectrum, to acquire certain information regarding the spectrum and determines which frequency band or bands the AP 14 can utilize for communicating with one or more the client stations 25 based on the received information. FIG. 2 is a block diagram of an example wireless local area network (WLAN) 200 which includes a communication device 202 (e.g., a central server) capable of providing information regarding TV white spaces, according to an embodiment. In an embodiment, the communication device 202 is a central database or another communication device that maintains certain information regarding TV spectrum. In the embodiment of FIG. 2, the AP 14 communicates with the communication device 202 via the wireless link 208. In another embodiment, the AP 14 communicates with the communication device 202 via a wired connection. According to an embodiment, the AP 14 communicates with the communication device 202 via the internet, for example.

Figure 3:
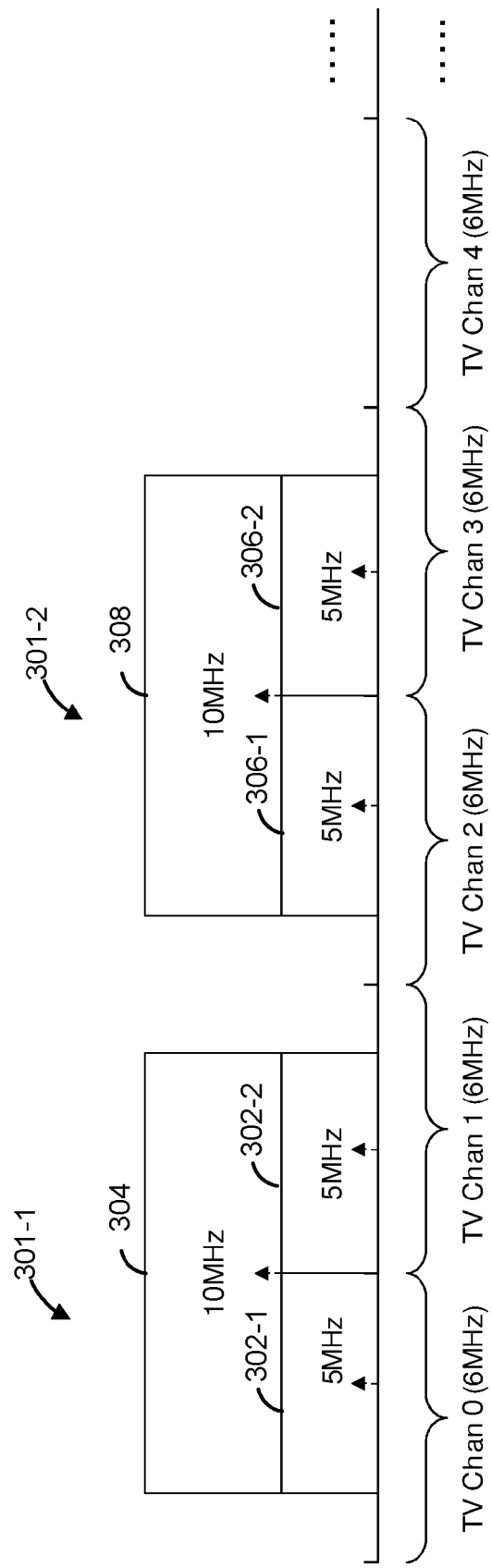
FIG. 3 is a diagram of an example channelization scheme, according to an embodiment.

According to an embodiment, the communication device 202 receives a geographical location from the AP 14 and provides to the AP 14 a list of TV channels available to the AP 14 for communicating with the client stations 25. To this end, according to an embodiment, the communication device 202 maintains a list of unused TV channels in various geographical locations and upon receiving an indication of a location from an AP provides to the AP the list of channels available in that location. As will be explained in more detail below, in some embodiments, in addition to the list of available channels, the communication device 202 provides various additional information that facilitates the AP 14 in selecting a channelization scheme to be used for communication with the client stations 25. In some embodiments, in addition to maintaining information regarding which TV channels are not being used by licensed devices (e.g., for TV broadcasting), the communication device 202 maintains certain information regarding WLAN devices operating in TVWS and utilizes such information to coordinate between the various WLAN devices. For example, in an embodiment, the communication device 202 allocates aligned and/or non-overlapping (or at least non-partially overlapping) WLAN channels within TVWS to neighboring basic service sets (BSS). In an embodiment, based on the received information, the AP 14 determines or selects a suitable channelization scheme (e.g., a channel map of communication channels that can be used for WLAN transmissions within the available TV whitespace band) and utilizes a communication channel defined by the selected communication scheme to communicate with a client stations 25. FIG. 3 is a diagram of an example channelization scheme 300 defined by the long range communication protocol for transmission of 5 MHz and 10 MHz WLAN channels in two contiguous available TV channel slots, according to an embodiment. In an embodiment, an AP utilizes the channelization scheme 300 when the AP determines that there are two contiguous TV channels available for WLAN communication. In some embodiments, an AP utilizes the channelization scheme 300 for operation in the 156 MHz TV whitespace even if four or more contiguous TV channels are available. In other words, in such embodiments, an AP does not utilize 20 MHz or 40 MHz channels in the 156 MHz TV whitespace even if an available TVWS bandwidth would allow the AP to utilize a larger channel.

The channelization scheme 300 includes a number of non-overlapping channel sets 301, each channel set 301 having two 5 MHz channels and a 10 MHz channel. As illustrated, the channel set 301-1 includes two 5 MHz channels 302 and a 10 MHz channel 304. In an embodiment, the 10 MHz channel 404 is transmitted using a carrier frequency $f_c$. In an embodiment, the carrier frequency $f_c$ is set to the center frequency of an available two TV channel frequency band, or to another frequency within the available band. According to the channelization scheme 30, the two 5 MHz channels 302 are transmitted in 5 MHz contiguous bands within the 10 MHz channel 304. Accordingly, in an embodiment, if the 10 MHz channel 304 has a center frequency $f_{c\_10}$, then the 5 MHz channel 302-1 has a center frequency equal to $f_{c\_10}-2.5$ MHz, and the 5 MHz channel 302-2 has a center frequency equal to $f_{c\_10}+2.5$ MHz.

According to an embodiment, the channelization scheme 300 is designed such that two consecutive 10 MHz channels are spaced by two TV channel bands (e.g., 12 MHz in the illustrated embodiment.) Because the channelization scheme 300 does not include any partial overlaps between any of the defined communication channels, WLAN devices that operate according to the channelization scheme 300 are able to accurately carrier-sense a communication channel prior to transmission, minimizing or eliminating packet collisions that sometimes result when two neighboring BSSs operate in partially overlapping channels, for example. Further, because each channel set is centered in an available frequency range, according to an embodiment, the channelization scheme 300 utilizes TV spectrum in a way to allow a suitably large guard interval between neighboring channel sets.

Further still, because the channelization scheme 300 defines transmission of 5 MHz communication channels within defined 10 MHz communication channels, an AP operating according to the channelization scheme 300 is able to transmit a 10 MHz channel or a 5 MHz channel without switching a carrier frequency $f_c$, and, accordingly, without switching a frequency of a local oscillator ($f_{LO}$) used to up-convert baseband signals to the carrier frequency $f_c$ and/or down-convert radio frequency (RF) signals at the carrier frequency $f_c$ to baseband. Thus, in various embodiments and/or scenarios, the channelization scheme 300 allows an AP to quickly and conveniently switch between various communication channels within the frequency range in which the AP operates. For example, if an AP communicates with a first client station using the 5 MHz channel 302-1, and with a second client station using the 5 MHz 302-2 (or using the entire 10 MHz channel 304), the AP is able to communicate with both client stations without having to switch between different carrier frequencies and, accordingly, without having to change a frequency of a local oscillator used for up-converting signals for transmission at the desired carrier frequency $f_c$ and/or down-converting RF signals at the carrier frequency $f_c$ to baseband. In another embodiment or situation, the AP switches from the 10 MHz channel 304 to one of the 5 MHz channels 302 without switching the carrier frequency and the local oscillator frequency when communication with a single client station.

In various embodiments and/or scenarios, the AP transmits a 5 MHz channel using a carrier frequency corresponding to a 10 MHz channel by transmitting only the desired 5 MHz half of the channel. To this end, in an embodiment, the AP generates a data unit for transmission in a 5 MHz communication channel by using a Fast Fourier Transform (FFT) size corresponding to a 10 MHz channel, but modulating or "energizing" only the portion of the FFT that corresponds to the desired 5 MHz span. The 10 MHz channel is then up-converted to the carrier frequency fc corresponding to the 10 MHz channel. As a result, the desired 5 MHz band is transmitted in the 10 MHz channel and using the carrier frequency corresponding to the 10 MHz channel.

Figure 4:
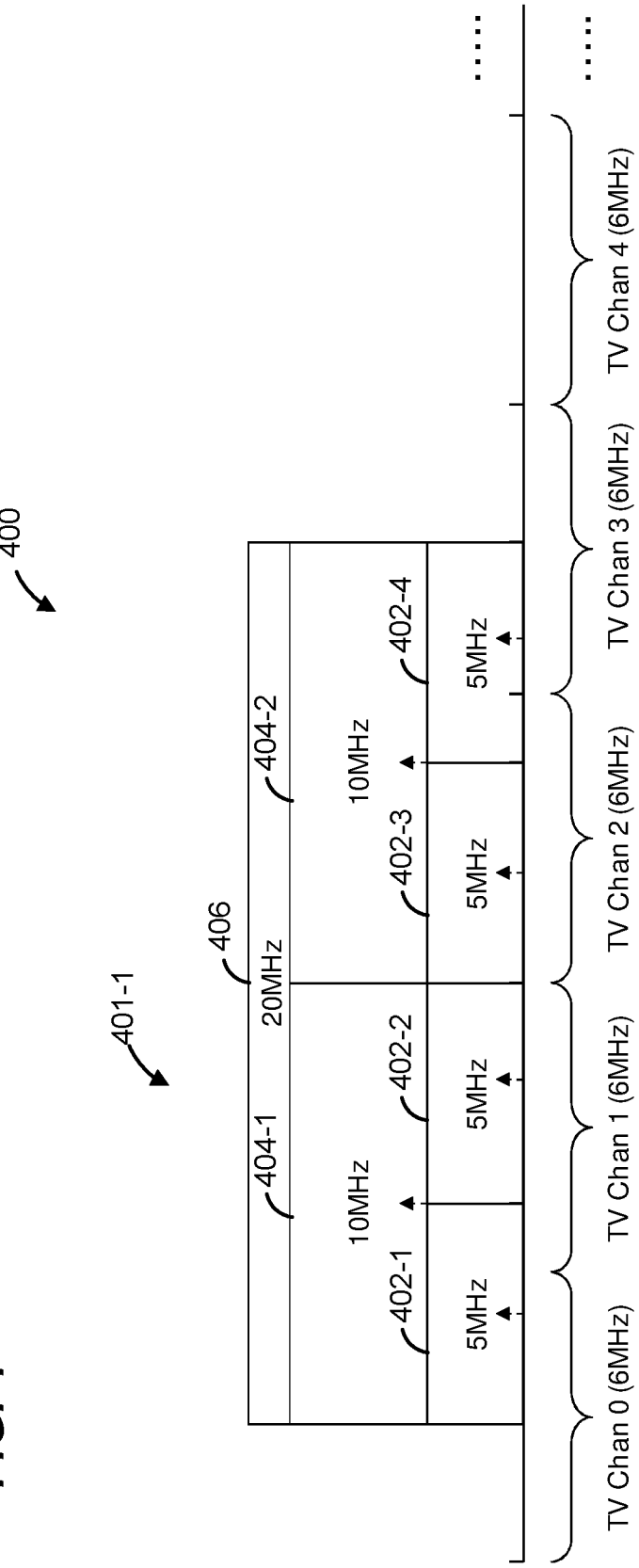
FIG. 4 is a diagram of another example channelization scheme, according to an embodiment.

FIG. 4 is a diagram of an example channelization scheme 400 defined by the long range communication protocol for transmission of 5 MHz, 10 MHz and 20 MHz WLAN channels in four contiguous available TV channels, according to an embodiment. In an embodiment, an AP utilizes the channelization scheme 400 when the AP determines that four contiguous TV channels are available for WLAN communication. In an embodiment, an AP utilizes the channelization scheme 400 for operation in the 450 MHz TV whitespace or in another suitable portion of TV spectrum.

The channelization scheme 400 includes a channel set 401 having four 5 MHz channels 402, two 10 MHz channels 404 and a 20 MHz channel 406. In an embodiment, the 20 MHz channel 406 is transmitted using a carrier frequency $f_c$. In an embodiment, the carrier frequency $f_c$ is set at the center of an available four TV channel frequency band, or to another frequency within the available band. According to the channelization scheme 400, the two 10 MHz channels 404 are transmitted in 10 MHz contiguous bands within the 20 MHz channel 404. Similarly, the four 5 MHz channels 402 are transmitted in four contiguous frequency bands within the 20 MHz channel 406. Accordingly, in an embodiment, if the 20 MHz channel 406 has a center frequency $f_{c\_20}$, then the 10 MHz channel 404-1 has a center frequency equal to $f_{c\_20}-5$ MHz, and the 10 MHz channel 404-2 has a center frequency equal to $f_{c\_20}+5$ MHz. Further, the 5 MHz channel 402-1 has a center frequency equal to $f_{c\_20}-7.5$ MHz, the 5 MHz channel 402-2 has a center frequency equal to $f_{c\_20}-2.5$ MHz, the 5 MHz channel 402-3 has a center frequency equal to $f_{c\_20}+2.5$ MHz, and the 5 MHz channel 402-4 has a center frequency equal to $f_{c\_20}+7.5$ MHz. Similar to the channelization scheme 300 of FIG. 3, according to an embodiment, an AP sets a local oscillator frequency $f_{LO}$ used for up-converting signals to a carrier frequency (and/or for down-converting RF signals at the carrier frequency to baseband) based on the center frequency corresponding to the 20 MHz communication channel 406. The AP is then able to transmit the 10 MHz channel 404 or a 5 MHz channel 402 at the same carrier frequency and without changing the local oscillator frequency $f_{LO}$. For example, in an embodiment, an AP generates a 5 MHz channel according to the channelization scheme 400 by energizing only the corresponding 5 MHz portion of the 20 MHz FFT used to generate the 20 MHz channel. Similarly, the AP generates a 10 MHz channel according to the channelization scheme 400 by energizing only the corresponding 10 MHz portion of the 20 MHz FFT used to generate the 20 MHz channel 406.

Also similar to the channelization scheme 300, the channelization scheme 400 is designed two consecutive 20 MHz channels are spaced by four TV channel slots (e.g., 24 MHz) to allow non-overlapping BSS operation and suitable guard intervals between the channel sets corresponding to the different carrier frequencies, for example, in various embodiments and/or scenarios.

According to an embodiment, as indicated above, an AP selects a channelization scheme to be used for communication with one or more client stations based on the amount of TV whitespace available for WLAN transmission. As an example, in one such embodiment, an AP selects the channelization scheme 300 of FIG. 3 when AP determines that a frequency band corresponding to two contiguous TV channel slots is available for WLAN communication, and selects the channelization scheme 400 of FIG. 4 when AP 14 determines that a frequency band corresponding to four contiguous TV channel slots is available for WLAN communication. Accordingly, in this embodiment, the AP 14 operates at a different carrier frequency and a different LO depending on TV channel availability for WLAN transmission.

Figure 5:
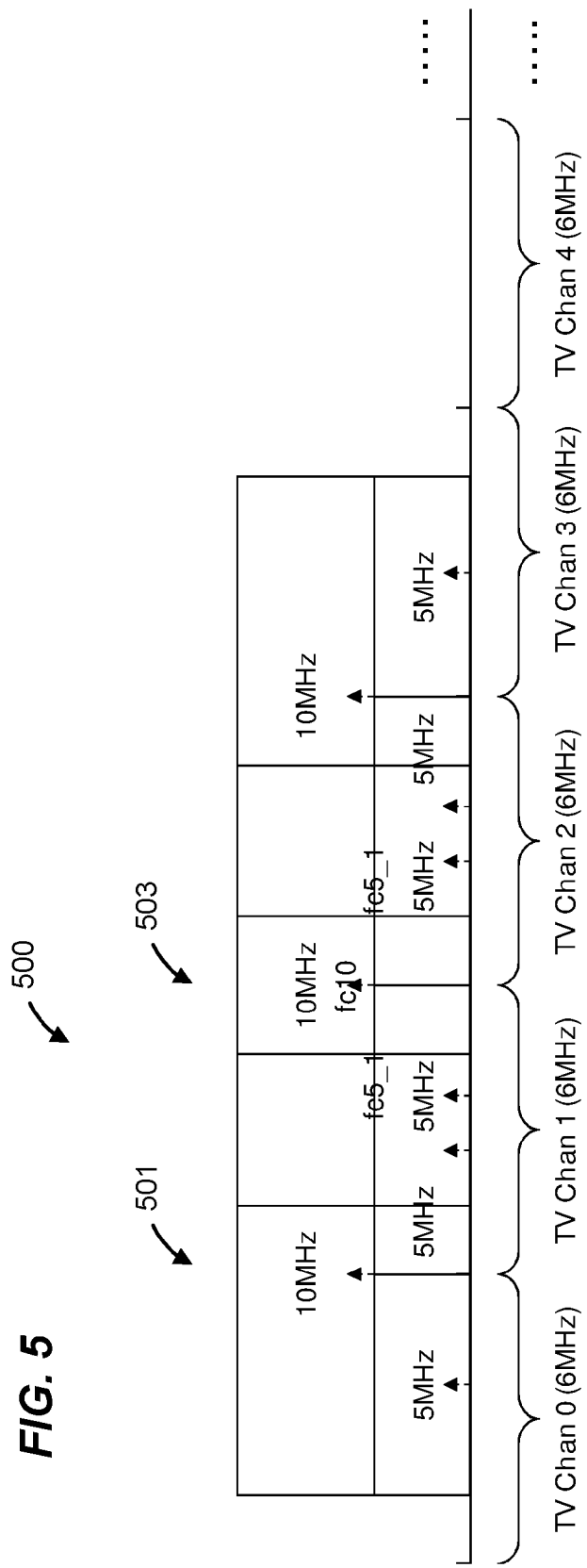
FIG. 5 is a diagram of yet another example channelization scheme, according to an embodiment.

FIG. 5 is a diagram of a channelization scheme 500 defined by the long range communication protocol for transmission of 5 MHz and 10 MHz bandwidth channels in two contiguous TV channels, according to an embodiment. The channelization scheme 500 is similar to the channelization scheme 300 of FIG. 3, except that in the channelization scheme 500, the defined channel sets are allowed to be only one TV channel width apart (e.g., 6 MHz). Accordingly, as illustrated, the channelization scheme 500 includes overlapping 10 MHz channels. Consequently, in an embodiment, two BSSs operating in adjacent channels in accordance with the channelization scheme 500 partially overlap. As a result, in such embodiments, in some situations, an AP and/or a client station senses the presence of a WLAN transmission in the overlapping portion of the 10 MHz communication channel and switches to transmission in the non-overlapping 5 MHz channel. In an embodiment, the AP operating in accordance with the channelization scheme 500 is able to switch to the non-overlapping 5 MHz channel without changing the carrier frequency $f_c$ (and, accordingly, without changing a local oscillator frequency $f_{LO}$).

FIG. 6 is a Table 600 illustrating various channelization schemes corresponding to various operating classes that the AP 14 utilizes for communicating with the client stations 25 in various embodiments and/or scenarios. In particular, the Table 600 defines a number of long range WLAN channels in the 450 MHz-650 MHz frequency range. Each row of the Table 600 corresponds to a particular operating class. In various embodiments and/or scenarios, a channel center frequency $F_c$ of a WLAN communication channel is determined according to Table 600 using Equation 1:

$$F_c = F_{start} + \text{Channel Number Multiplier} * \text{Channel Number} \quad \text{Equation 1}$$

where $F_{start}$ is an operating class start frequency.

In some embodiments, the long range communication protocol specifies a number of possible channel maps defining various WLAN channels within an available frequency band in the frequency spectrum allocated for TV transmission, with a unique channel map defined for each possible frequency band. As discussed above, a TV channel slot is typically larger than a smallest bandwidth WLAN channel specified by the long range communication protocol, in various embodiments and/or scenarios. For example, in an embodiment, each TV channel is 6 MHz wide. Accordingly, in this embodiment, frequency ranges available for WLAN transmission are typically multiples of 6 MHz, with the specific available bandwidth depending on the number of contiguous available TV channels. Data units conforming to the long range communication protocol, on the other hand, are transmitted in channels having bandwidths that are multiples of a different channel width (e.g., 2 MHz, 3 MHz, 4 MHz, 5 MHz.), according to an embodiment. Accordingly, in such embodiments, there is a number of ways in which WLAN communication channels defined by the long range communication protocol can be placed within the larger available TV frequency band. For example, possible channel maps for placing a 5 MHz WLAN channel in a frequency band corresponding one available 6 MHz TV channel slot, in an embodiment, include centering the 5 MHz channel in the 6 MHz frequency band or placing an edge of a 5 MHz channel at an edge of the 6 MHz frequency band, for example.

Accordingly, in various embodiments, the long range communication protocol defines a number of possible channel maps that efficiently "pack" WLAN communication channels into available TV frequency bands. For example, in an embodiment, the long range communication protocol provides a set of channel maps that, wherein each channel map in the set of channel maps specifies a channel pattern that is centered in a respective frequency band (e.g., 6 MHz frequency band for one available TV channel slot, 12 MHz frequency band for two available contiguous TV channel slots, etc.). Similarly, in an embodiment, the long range communication protocol provides a set of channel maps, wherein each channel map in the set of channel maps specifies a channel pattern that is aligned with an edge of a respective frequency band. As another example, in another embodiment, the long range communication protocol a set of channel maps that, wherein channel maps corresponding to an odd number of available contiguous TV channel slots specify channel patterns that are centered in the respective frequency bands, and channel maps corresponding to an even number of available contiguous TV channel slots specify channel patterns that are aligned with an edge of the respective frequency bands. In general, a channel map provided by the long range communication protocol specifies any suitable channel pattern for a corresponding frequency band, in various embodiments and/or scenarios.

In an embodiment, a communication device (e.g., the AP 14) determines an available frequency band for WLAN communication (e.g., the number of contiguous unused TV channel slots), and selects a channel map predefined for the available frequency band. In an embodiment, the communication device selects a communication channel from the selected channel map and utilizes the selected communication channel for communication with other devices in the network (e.g., client stations 25).

Figure 7:
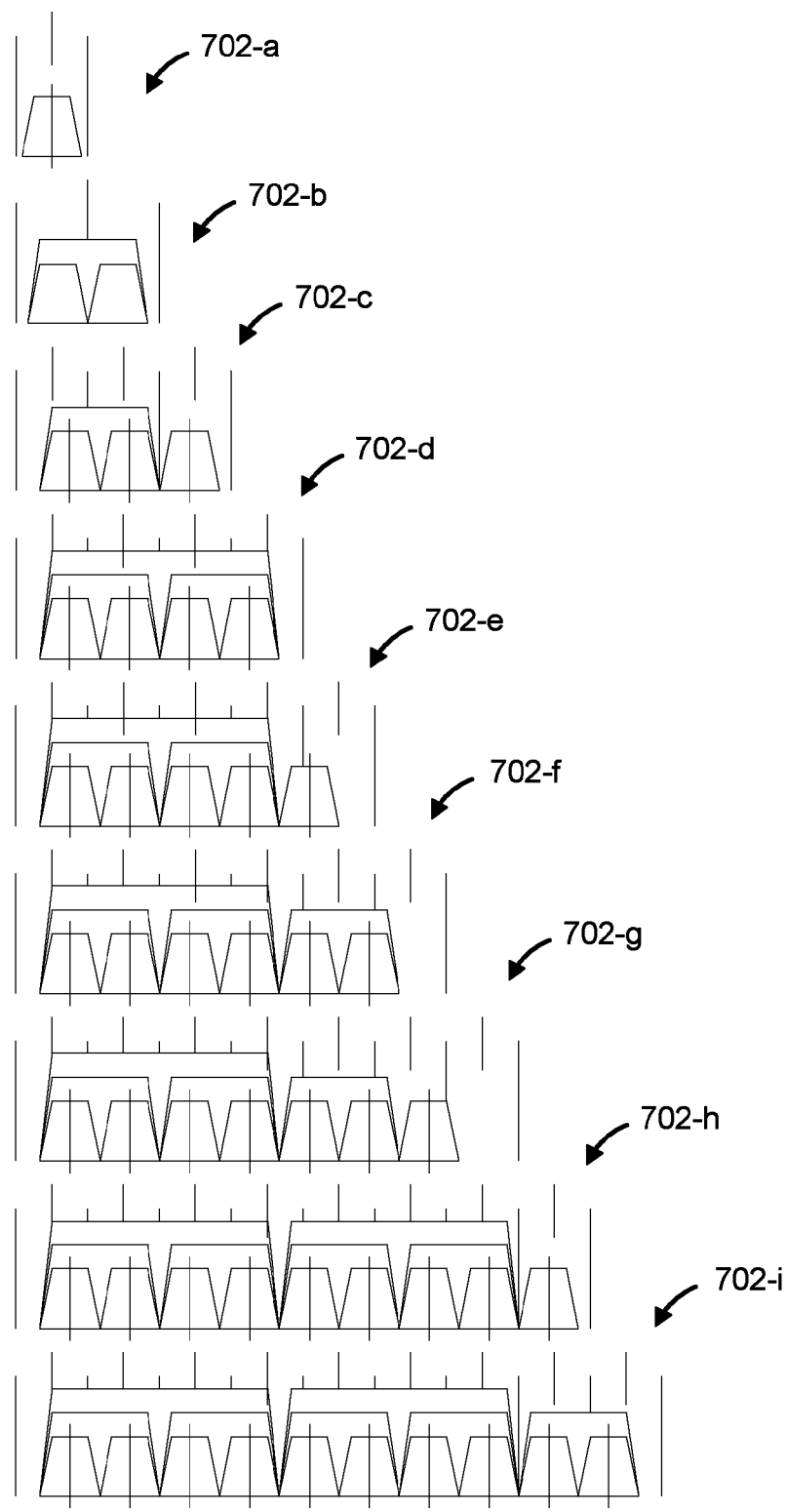
FIG. 7 includes diagrams of predefined channel maps for a number of contiguous available TV bands, according to an embodiment.

FIG. 7 illustrates predefined channel maps 702-*a* through 702-*i* for the number of contiguous available TV bands equal to 1-9, respectively, according to an embodiment. As illustrated, in this embodiment, the various channel maps are aligned with respect to center frequencies of the defined WLAN communication channels. In such embodiments, because the channel map set illustrated in FIG. 7, WLAN devices that selects a channel map from the channel maps illustrated in FIG. 7, are able to accurately carrier-sense a communication channel prior to transmission, minimizing or eliminating packet collisions that sometimes result when two overlapping BSSs operate using partially overlapping communication channels, for example.

Figure 8:
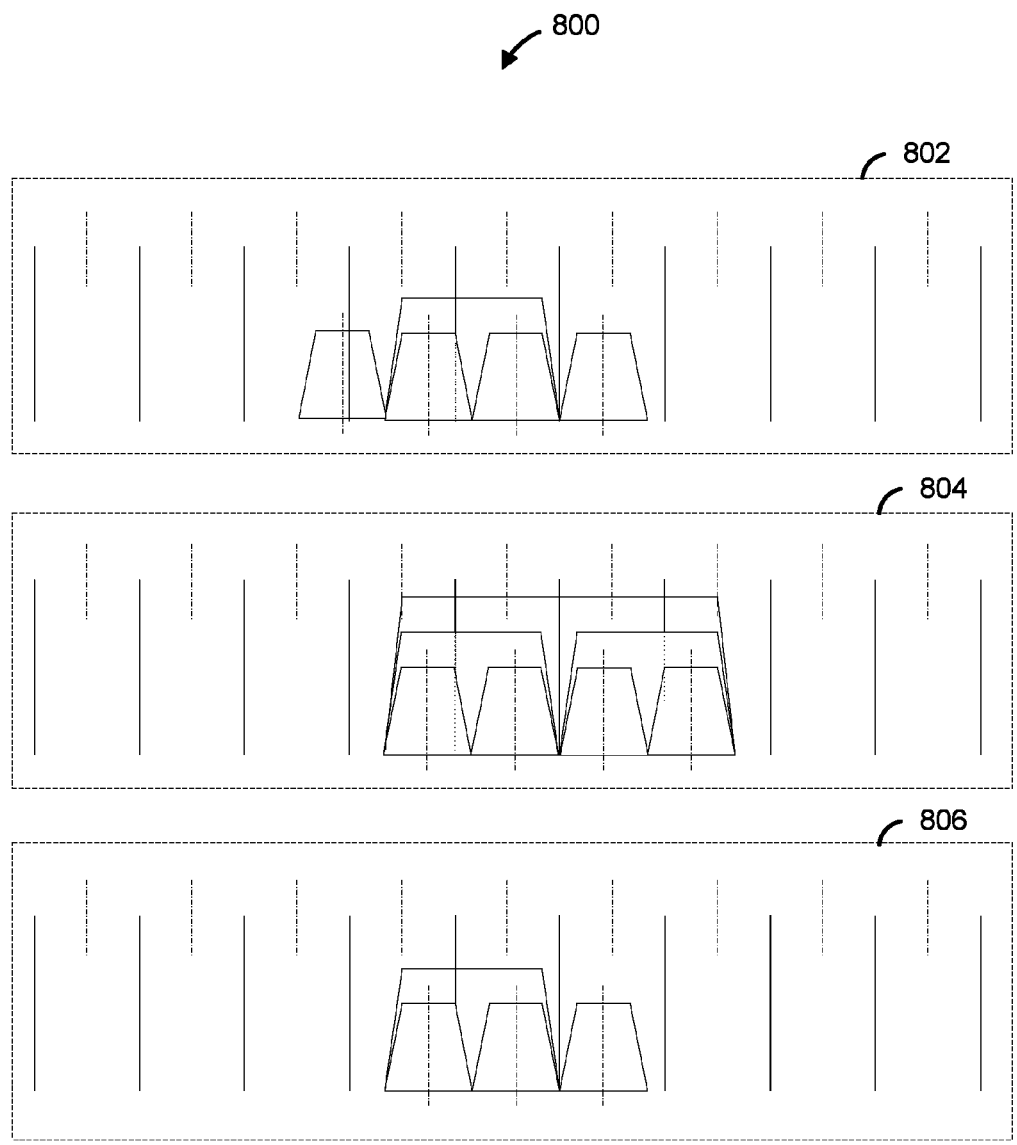
FIG. 8 is a diagram illustrating a set of channel maps, according to an embodiment.

FIG. 8 is a diagram illustrating a set of channel maps 800 in which the defined channels are aligned in frequency, according to an embodiment. In an embodiment, a first communication device utilizes the channel map 802, a second communication device utilizes the channel map 804, and a third communication device utilizes the channel map 806. As illustrated in FIG. 8, in this embodiment, the channel maps 800 are designed such the defined communication channels are aligned in frequency (i.e., without any channels that partially overlap). Consequently, in this embodiment, communication devices operating in neighboring (or overlapping) BSSs are able to perform carrier-sensing of a communication channel and accurately detect whether the channel is being utilized by a neighboring device. Accordingly, in some embodiments, such channel maps are used to coordinate channelization for multiple communication devices and thereby minimize or eliminate packet collisions that sometimes result when two neighboring (or overlapping) BSSs operate in partially overlapping channels, for example.

In an embodiment, a WLAN device (e.g., AP 14 FIG. 1) determines the number of contiguous available TV channels by scanning the TV frequency range and selects a predetermined channel map (e.g., one of the channel maps 702 of FIG. 7) based on the results of the scan (i.e., based on the available spectrum). In another embodiment, a WLAN device (e.g. AP 14 of FIG. 1) provides the geographical location of the device to a central database (or another communication device that maintains certain TV channel spectrum information), receives from the central database an indication of the number and locations of the available channels, and selects a predetermined channel map based on the received information. In yet another embodiment, the central database provides certain additional information to the WLAN device and the device determines a channel map based in part on the additional information. For example, in an embodiment, the central database provides a channel center frequency in addition to the available frequency range, and the AP establishes the WLAN channel according to the received center frequency. In other embodiments and/or scenarios, the central database provides other information describing various channels or channel maps to be used for WLAN transmission within the available frequency range.

FIG. 9A is a Table 900 illustrating example PHY parameters corresponding to 5 MHz, 10 MHz, 20 MHz, and 40 MHz communication channels, according to an embodiment. In this example embodiment, long range data units are generated at least substantially according to a PHY format (Greenfield or mixed mode) specified by the IEEE 802.11n Standard. In other embodiments, long range data units are generated at least substantially according to a different PHY format specified by a short range communication protocol (e.g., the IEEE 802.11a Standard, the IEEE 802.11ac Standard, etc.) In any case, as indicated by the symbol duration column of the Table 900, long range data units for 40 MHz and 20 MHz communication channels are generated using the clock rate specified by the corresponding short range communication protocol ("regular short range clock rate"), while long range data units for 10 MHz and 5 MHz communication channels are generated using a clock rate that is down clocked from the regular short range clock rate by a down-clocking factor 4. As a result, in this embodiment, symbol duration of each OFDM symbol of a 5 MHz or a 10 MHz data unit (e.g. 16 µs) is four times longer compared to symbol duration of each OFDM symbol of a 20 MHz or a 40 MHz data unit (e.g., 4 µs).

In one such embodiment, 5 MHz and 10 MHz long range data units generated using a down-clocked clock rate are used in one region of the sub-GHz frequency spectrum (e.g., in the 156 MHz TV channel spectrum), while 20 MHz and 40 MHz data units generated using a short range communication protocol clock rate are used in a different frequency region (e.g., in the 450 MHz TV channel spectrum). In other embodiments, long range data units generated using different clock rates coexist in the same frequency range. In some such embodiment, various auto-detection techniques, some of which are described below, are used by a receiving device to determine the particular clock rate used for generating a data unit.

FIG. 9B is a Table 950 illustrating example PHY parameters defined by the long range communication protocol for 5 MHz, 10 MHz, 20 MHz, and 40 MHz communication channels, according to another embodiment. In this embodiment, long range data units are generated using a same clock rate regardless of the particular communication channel bandwidth. In this embodiment, 5 MHz/10 MHz long range data units are generated at least substantially according to a PHY format (Greenfield or mixed mode) specified by the IEEE 802.11n Standard and a 20 MHz and 40 MHz communication channel PHY format that is at least substantially the same as a PHY format specified by the IEEE 802.11ac Standard. More specifically, in the illustrated embodiment, 5 MHz PHY format corresponds to down-clocked 20 MHz IEEE 802.11n Standard PHY format, 10 MHz PHY format corresponds to 40 MHz IEEE 802.11n Standard PHY format, 20 MHz communication channels data unit is a down-clocked version of a 80 MHz IEEE 802.11ac Standard data unit, and a 40 MHz data unit is a down-clocked version of a 20 MHz IEEE 802.11ac Standard data unit. In contrast to the PHY formats illustrated in the table 900 of FIG. 9A, in this embodiment, the long range communication protocol specifies a single clock rate to be used for generating long range data units for transmission in the four specified channel bandwidths. Specifically, in the embodiment shown in the table 950, long range data units for transmission in 5 MHz, 10 MHz, 20 MHz, and 40 MHz communication channels are generated using a clock rate that is down-clocked from the clock rate used for generating the corresponding short range data units by a down-clocking factor of 4. As a result, in this case, long range data units for transmission in each of the four specified channel bandwidths have a symbol duration that is four times longer than the symbol duration of the corresponding short range data units.

Various examples of long range data units generated by down-clocking as well as example PHY formats of long range data units are described in U.S. patent application Ser. No. 13/359,336, filed Jan. 26, 2012, which is hereby incorporated by reference herein in its entirety. As also described in U.S. patent application Ser. No. 13/359,336, in some embodiments, data units conforming to the long range communication protocol include preambles that are different from the preambles specified by a short range communication protocol (e.g., a longer preamble included in a long range data unit, more pilot tones inserted into certain fields of the long range data unit preambles, etc.), such that long range data units are more suitable for long range transmission.

In some embodiments utilizing different clock rates for different bandwidth channels (e.g., as shown in FIG. 9A), various medium access parameters (e.g., the slot duration corresponding to a time during which a device is allowed to transmit data in a channel, the interframe space (IFS) intervals during which a device does not have access to a channel, the clear channel assessment time (CCATime), etc.) are the same for all allowed channels allowing operation with different clock rates but using set (i.e., non-dynamic) medium access parameters. For instance, the long range communication protocol defines various medium access parameters that are the same as the corresponding medium access parameters defined by a short range communication protocol (e.g., same medium access parameters as the parameters defined by the IEEE 802.11a Standard, the IEEE 802.11n Standard, the IEEE 802.11ac Standard, etc.), according to one such embodiment. In another embodiment, the long range communication protocol defines medium access parameters based on the down-clocked clock rate, e.g., having longer time durations and intervals (e.g., by a factor same as the down-clocking factor, e.g., 4) compared to the time durations and intervals defined by a short range communication protocol. Similarly, in an embodiment utilizing a down-clocked version of the IEEE-802.11ac PHY format, various medium access parameters (e.g., the slot duration corresponding to a time during which a device is allowed to transmit data in a channel, the interframe space (IFS) intervals during which a device does not have access to a channel, the clear channel assessment time (CCATime), etc.) are lengthened by the down-clocking factor (e.g., by a factor of 4).

Because no legacy devices typically operate in the sub-GHz frequency range, according to an embodiment, the long range communication protocol specifies a PHY format based on the IEEE 802.11n Standard Greenfield mode and/or the IEEE 802.11a Standard PHY format, but does not specify a PHY format based on the IEEE 802.11n mixed mode PHY format. Further, in some embodiments, the long range communication protocol specifies a PHY format that is similar to the PHY format defined by the IEEE 801.11ac Standard, but specifies a mixed-mode preamble (e.g., omits the legacy portion of the preamble specified by the IEEE-802.11ac Standard).

In an embodiment, the long range communication protocol utilizing a down-clocked version of the IEEE-802-11ac Standard PHY format for some or all specified bandwidth channels, the long range communication protocol includes various tone mapping, encoding, interleaving, modulation and coding scheme (MCS) exclusions, etc. that are included in the IEEE-802-11ac Standard. Further, in some embodiments, MCS 32, specified in the IEEE 802-11n Standard as the lowest data rate MCS in which data is repeated in a lower and an upper portion of a communication channel, is extended to larger bandwidth modes of the long range communication protocol. Accordingly, in this embodiment, the long range communication protocol defines an MCS similar to the MCS 32 defined by the IEEE 802-11n Standard, according to which data units generated for a 10 MHz channel include two repetitions of the transmitted data, data units generated for a MHz channel include four repetitions of the transmitted data, and data units generated for a 40 MHz channel include eight repetitions of the transmitted data.

In some embodiments, the long range communication protocol specifies one or more higher sensitivity single carrier (SC) modes based on a single carrier short range communication protocol PHY format (e.g., the IEEE 802.11b Standard), in addition to OFDM modes, to be used for applications requiring longer communication range or higher sensitivity operation, for example. In one such embodiment, long range data units conforming to a single carrier PHY format are down-clocked versions (e.g., by down-clocking factor of 4) are transmitted in 5 MHz communication channels (smallest bandwidth and longest communication range channel specified by the long range communication protocol) and have an SC PHY format at least substantially the same as PHY format specified by the IEEE 802.11b Standard (e.g., IEEE 802.11b direct sequence spread spectrum (DSSS) PHY format.

Example long range single carrier modes used in some embodiments are also described in U.S. patent application Ser. No. 13/359,336.

In some embodiments, a portion of a long range data unit (e.g., the preamble or a portion of the preamble) is formatted in a way as to allow a receiving device to determine or auto-detect the particular clock rate and/or the particular modulation that was used to generate the data unit and thereby allow the receiving device to properly decode the data. For instance, in an embodiment, a receiving device determines the clock rate (e.g., the 5 MHz/10 MHz clock rate or the 20 MHz/40 MHz clock rate) and/or the modulation (e.g., SC or OFDM) based on a value of the start frame delimiter (SFD) sequence included in the preamble of the data unit. In other words, in this embodiment, the SFD value in the preamble of a data unit signals to a receiving device whether the subsequent fields of the data unit were generated using a 5 MHz/10 MHz channel clock rate in OFDM mode, a 20 MHz/40 MHz channel clock rate in OFDM mode, or a 5 MHz clock rate in SC carrier mode. Example long range data units that include a single carrier preamble portion with and SFD field which is used for PHY format auto-detection are also described No. 13/359, 336.

In another embodiment in which different clock rates are used for different bandwidth channels defined by the long range communication protocol, a receiving device performs multiple auto-correlations in parallel on a short training field (STF) included in a preamble of a data unit to determine the particular clock rate that was used to generate the data unit. In particular, in an example embodiment in which there are two possible clock rates, a receiving device performs two auto-correlations, each corresponding to a possible clock rate, and determines which of the two clock rates was used to generate the data unit according to which auto-correlation produces a rising carrier sense signal, for example. In an embodiment, if both auto-correlations result in a rising carrier sense, then auto-detection is based on the time duration between the rise in carrier sense signal and the drop of carrier sense signal (e.g., signaling the boundary between the short training field and the following long training field). More specifically, as an example, a data unit generated using a ¼ down-clocked short range clock rate includes a same number of short training sequence repetitions as a data unit generated using a regular short range clock rate, according to an embodiment. Accordingly, in this case, the short training field of a data unit generated the lower clock rate is four times longer compared to the short training field of a data unit generated using the higher clock rate. For a more detailed description of clock rate auto-detection techniques used in some embodiments, refer to U.S. patent application Ser. No. 13/365,950, filed Feb. 3, 2012, which is hereby incorporated by reference herein in its entirety.

In some embodiments, receiving devices are able to auto-detect between data units using a same clock rate but generated according to a different PHY format. FIGS. 10A and 10B illustrate data units generated using a down-clocked clock rate and a regular short range clock rate, respectively, according to an embodiment. In an embodiment, the data units 1000 are generated using a clock signal that is down-clocked from a regular short range clock signal (e.g., by a down-clocking ratio of 4, or another suitable down-clocking ratio). In the illustrated embodiment, the data unit 1010 is generated according to an IEEE 802.11b DSSS PHY format, the data unit 1020 is generated according to an IEEE 802.11a Standard PHY format, and the data unit 1030 is generated according to an IEEE 802.11n PHY format. Each of the data units 1000 is generated using a down-clocked clock signal and is transmitted in a 5 MHz or a 10 MHz channel, according to an embodiment. A receiving device tuned to the 5 MHz or the 10 MHz channel auto-detects whether the data unit is a single carrier data unit such as the data unit 1010 or an OFDM data unit, such as one of the data units 1020 and 1030 based on whether the beginning of a preamble included in a data unit is modulated according to a DSSS or an OFDM modulation (e.g., as indicated by the arrow 1002), respectively, according to an embodiment. Further, in an embodiment, if it is determined that the data unit is an OFDM data unit, the receiving device determines whether the data unit is the data unit 1020 or the data unit 1030 based on the modulation of the signal field (e.g., as indicated by the arrow 1004) following the respective long training field (LTF).

Referring now to FIG. 10B, data units 1050 are generated using a regular short range clock rate, and are transmitted in a 20 MHz or a 40 MHz communication channel, according to an embodiment. The data unit 1060 is generated according to the IEEE 802.11a Standard PHY format, while the data unit 1070 is generated according to the IEEE 802.11n PHY format. In an embodiment, a receiving device determines whether the data unit being received is the data unit 1060 or the data unit 1070 based on the modulation of the signal field (e.g., as indicated by the arrow 1052) following the LTF field of a preamble included in the data unit.

Figure 11:
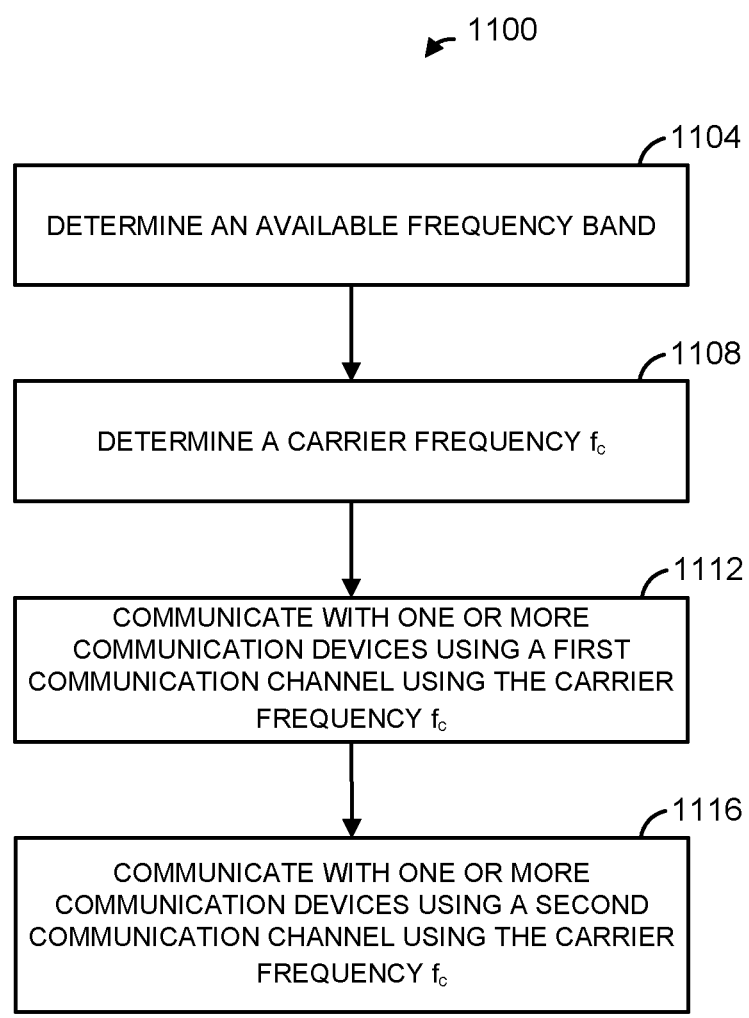
FIG. 11 is a flow diagram of an example method, according to an embodiment.

FIG. 11 is a flow diagram of an example method 1100, according to an embodiment. With reference to FIG. 1, the method 1100 is implemented by the network interface 16, in some embodiments. For example, in one such embodiment, the PHY processing unit 20 is configured to implement the method 1100. According to another embodiment, the MAC processing unit 18 is also configured to implement at least a part of the method 1100. With continued reference to FIG. 1, in yet another embodiment, the method 1100 is implemented by the network interface 27 (e.g., the PHY processing unit 29 and/or the MAC processing unit 28). In other embodiments, the method 1100 is implemented by other suitable network interfaces.

At block 1104, a first communication device (e.g., the AP 14 of FIG. 1) determines an available frequency band for communication. In an embodiment, the available frequency band corresponds to an available frequency range within the TV licensed frequency band. In one embodiment, the first communication device determines the available frequency band by using a carrier sense technique to scan one or more possible communication channels. In another embodiment, the first communication device determines the available frequency band based on a received indication of available spectrum from a central database (e.g., the central server 202 of FIG. 2) or from another communication device.

At block 1108, the first communication device determines a carrier frequency based on the available frequency band determined at block 1104.

At block 1112, the first communication device communicates with one or more communication devices using a first communication channel. In an embodiment and/or scenario, the first communication channel is a 10 MHz channel centered at the carrier frequency, for example. In another embodiment and/or scenario, the first communication channel is a 5 MHz communication channel with a center frequency equal to $f_c-2.5$ MHz or a 5 MHz communication channel with center frequency equal to $f_c+2.5$ Mhz. In other embodiments and/or scenarios, the first communication channel is another suitable communication channel within the available frequency band.

At block 1116, the first communication device communicates with one or more communication devices using a second communication channel and using the same carrier frequency $f_c$. In an embodiment, the center frequency of the second communication channel is different than the center frequency of the first communication channel. For instance, in an embodiment and/or scenario, the first communication channel a 10 MHz communication channel centered at the carrier frequency $f_c$, and the second communication channel is a 5 MHz communication channel with a center frequency equal to $f_c-2.5$ MHz. In other words, in this embodiment, the second communication channel corresponds to the lower half band of the first communication channel. In an embodiment, the first communication device generates the second communication channel by modulating only a portion (e.g., a half band, a quarter band, etc.) of the first communication channel.

Figure 12:
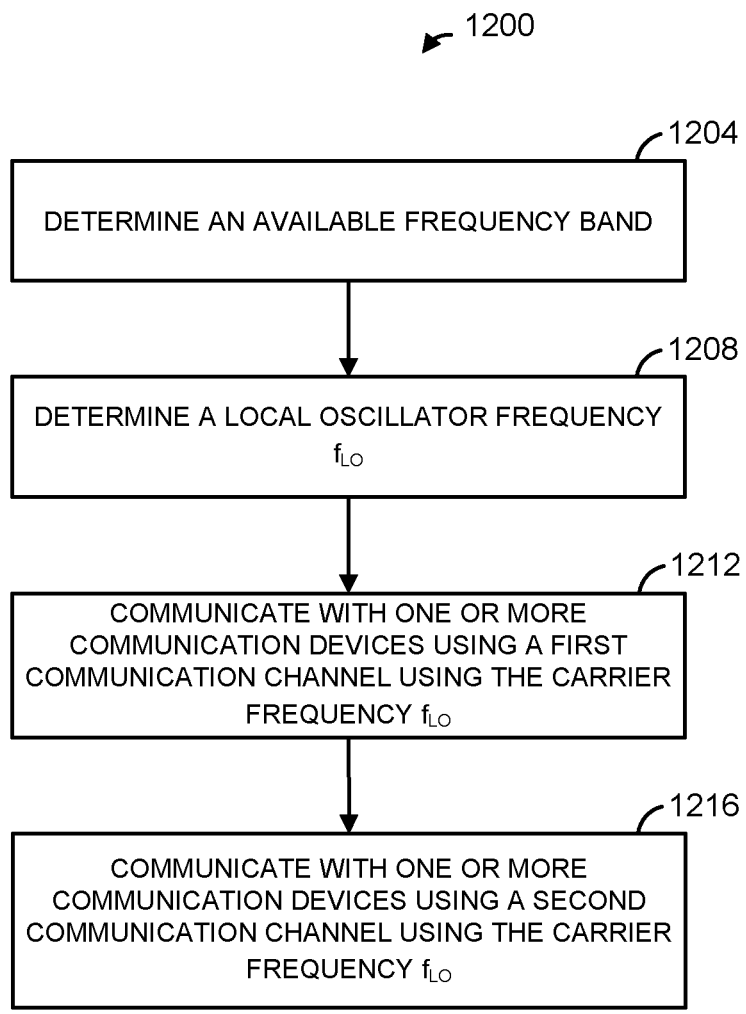
FIG. 12 is a flow diagram of another example method, according to another embodiment.

FIG. 12 is a flow diagram of an example method 1200, according to an embodiment. With reference to FIG. 1, the method 1200 is implemented by the network interface 16, in some embodiments. For example, in one such embodiment, the PHY processing unit 20 is configured to implement the method 1200. According to another embodiment, the MAC processing unit 18 is also configured to implement at least a part of the method 1200. With continued reference to FIG. 1, in yet another embodiment, the method 1200 is implemented by the network interface 27 (e.g., the PHY processing unit 29 and/or the MAC processing unit 28). In other embodiments, the method 1200 is implemented by other suitable network interfaces.

At block 1204, a first communication device (e.g., the AP 14 of FIG. 1) determines an available frequency band for communication. In an embodiment, the available frequency band corresponds to an available frequency range within the TV licensed frequency band. In one embodiment, the first communication device determines the available frequency band by using a carrier sense technique to scan one or more possible communication channels. In another embodiment, the first communication device determines the available frequency band based on a received indication of available spectrum from a central database (e.g., the central server 202 of FIG. 2) or from another communication device.

At block 1208, the first communication device determines a local oscillator frequency $f_{LO}$ based on the available frequency band determined at block 1104.

At block 1112, the first communication device communicates with one or more communication devices using a first communication channel. In an embodiment and/or scenario, the first communication channel is a 10 MHz channel centered at a carrier frequency $f_c$ that corresponds to the local oscillator frequency determined at block 1208, for example. In another embodiment and/or scenario, the first communication channel is a 5 MHz communication channel with a center frequency equal to $f_c-2.5$ MHz or a 5 MHz communication channel with center frequency equal to $f_c+2.5$ Mhz. In other embodiments and/or scenarios, the first communication channel is another suitable communication channel within the available frequency band.

At block 1216, the first communication device communicates with one or more communication devices using a second communication channel and using the local oscillator frequency $f_{LO}$ determined at block 1208. In an embodiment, the center frequency of the second communication channel is different than the center frequency of the first communication channel. As an example, in an embodiment and/or scenario, the first communication channel a 10 MHz communication channel centered at the carrier frequency $f_c$, and the second communication channel is a 5 MHz communication channel with a center frequency equal to $f_c-2.5$ MHz. In other words, in this embodiment, the second communication channel corresponds to the lower half band of the first communication channel. In an embodiment, the first communication device generates the second communication channel by modulating only a portion (e.g., a half band, a quarter band, etc.) of the first communication channel.

Figure 13:
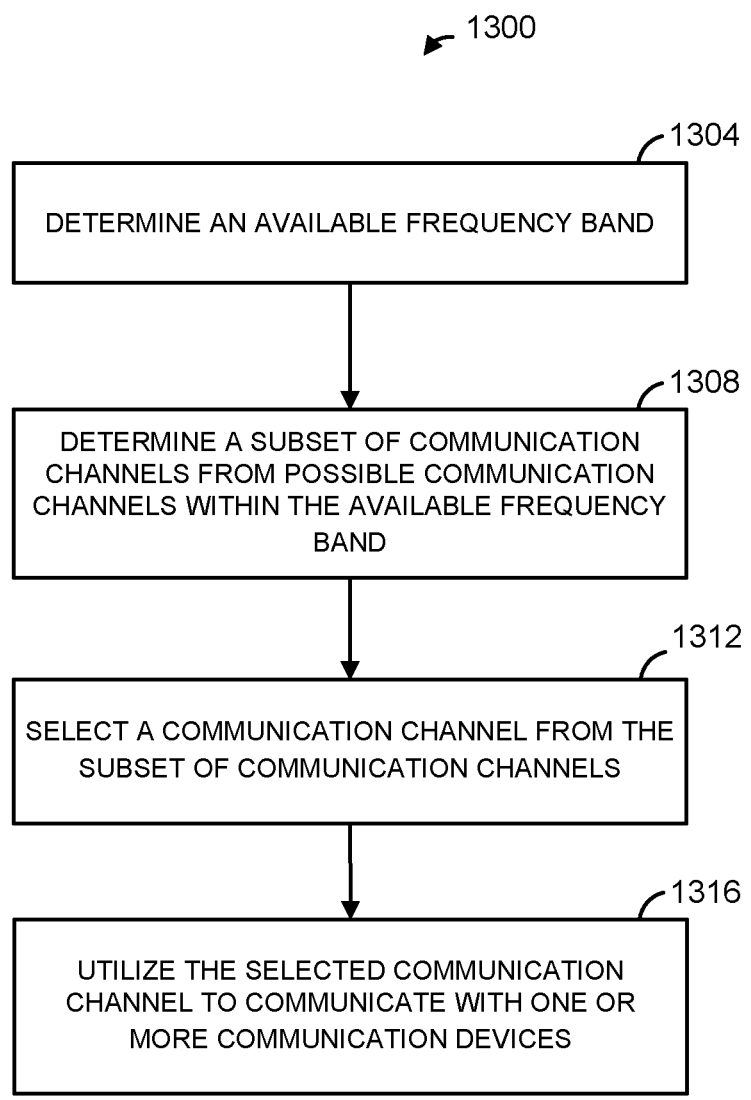
FIG. 13 is a flow diagram of yet another example method, according to yet another embodiment.

FIG. 13 is a flow diagram of an example method 1300, according to an embodiment. With reference to FIG. 1, the method 1300 is implemented by the network interface 16, in some embodiments. For example, in one such embodiment, the PHY processing unit 20 is configured to implement the method 1300. According to another embodiment, the MAC processing unit 18 is also configured to implement at least a part of the method 1300. With continued reference to FIG. 1, in yet another embodiment, the method 1300 is implemented by the network interface 27 (e.g., the PHY processing unit 29 and/or the MAC processing unit 28). In other embodiments, the method 1300 is implemented by other suitable network interfaces.

At block 1304, a first communication device (e.g., the AP 14 of FIG. 1) determines an available frequency band for communication. In an embodiment, the available frequency band corresponds to an available frequency range within the TV licensed frequency band. In one embodiment, the first communication device determines the available frequency band by using a carrier sense technique to scan one or more possible communication channels. In another embodiment, the first communication device determines the available frequency band based on a received indication of available spectrum from a central database (e.g., the central server 202 of FIG. 2) or from another communication device.

At block 1308, the first communication device determines a subset of communication channels from possible communication channels within the available frequency band. For example, in an embodiment, the first communication device selects one of the channel subsets 702 of FIG. 7 depending on the available frequency band (e.g., 702-a if one TV slot is available, 702-b if two TV slots are available, 702-c if three slots are available, etc.).

At block 1312, the first communication device selects a communication channel from the subset of communication channels selected at block 1308. At block 1316, the first communication device communicates with one or more communication devices using selected communication channel.

Figure 14:
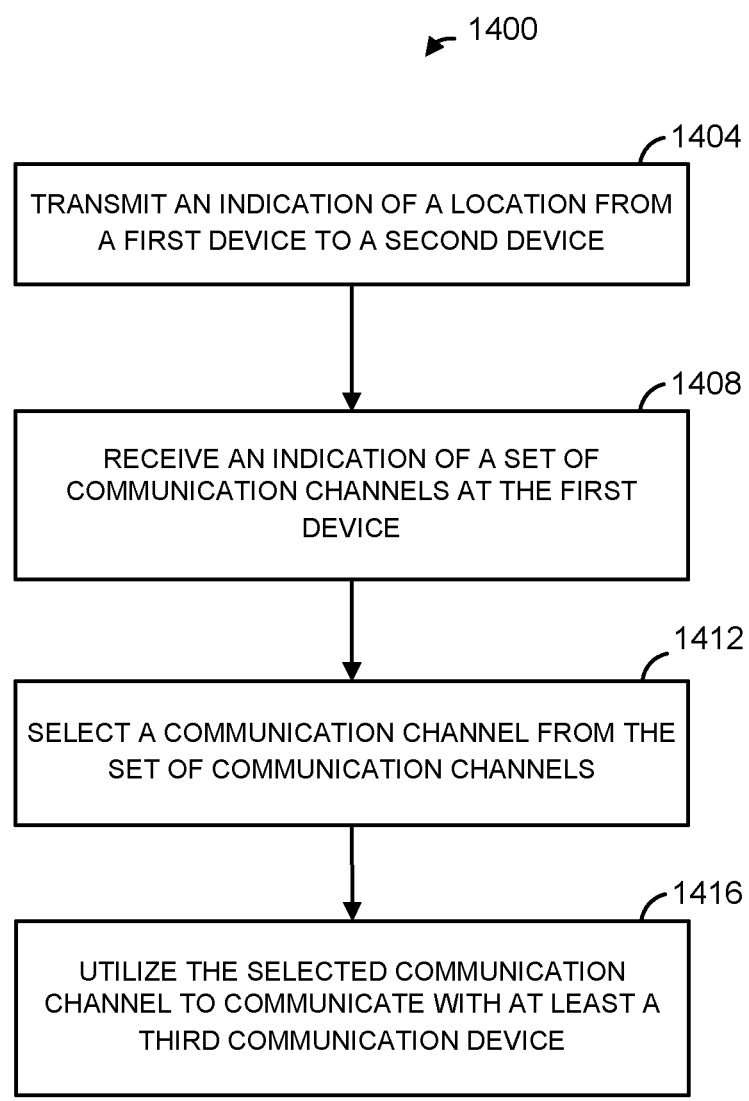
FIG. 14 is a flow diagram of yet another example method, according to yet another embodiment.

FIG. 14 is a flow diagram of an example method 1400, according to an embodiment. With reference to FIG. 1, the method 1400 is implemented by the network interface 16, in some embodiments. For example, in one such embodiment, the PHY processing unit 20 is configured to implement the method 1400. According to another embodiment, the MAC processing unit 18 is also configured to implement at least a part of the method 1400. With continued reference to FIG. 1, in yet another embodiment, the method 1400 is implemented by the network interface 27 (e.g., the PHY processing unit 29 and/or the MAC processing unit 28). In other embodiments, the method 1400 is implemented by other suitable network interfaces.

At block 1404, a first communication device (e.g., the AP 2 of FIG. 2) transmits an indication of a geographical location of the first communication device to a second communication device (e.g., the central database 202 of FIG. 2).

At block 1408, the first communication device receives an indication of a set of communication channels available for communication by the first communication device. In one embodiment, the indication of a set of channels is an indication of an available frequency range. In an embodiment, the first communication device selects a predetermined set of channels defined for the available frequency range. In another embodiment, the indication of a set of channels includes specific channels (e.g., specific channel center frequencies and/or specific channel bandwidths) that can be used by the first communication device. In another embodiment, the indication corresponds to other suitable information that allows the first communication device to determine a set of communication channels that can be used for communicating with other communication device in an available frequency range.

At block 1412, the first communication device selects a communication channel from the set of communication channels determined at block 1408. At block 1316, the first communication device communicates with one or more communication devices using selected communication channel.

Figure 15:
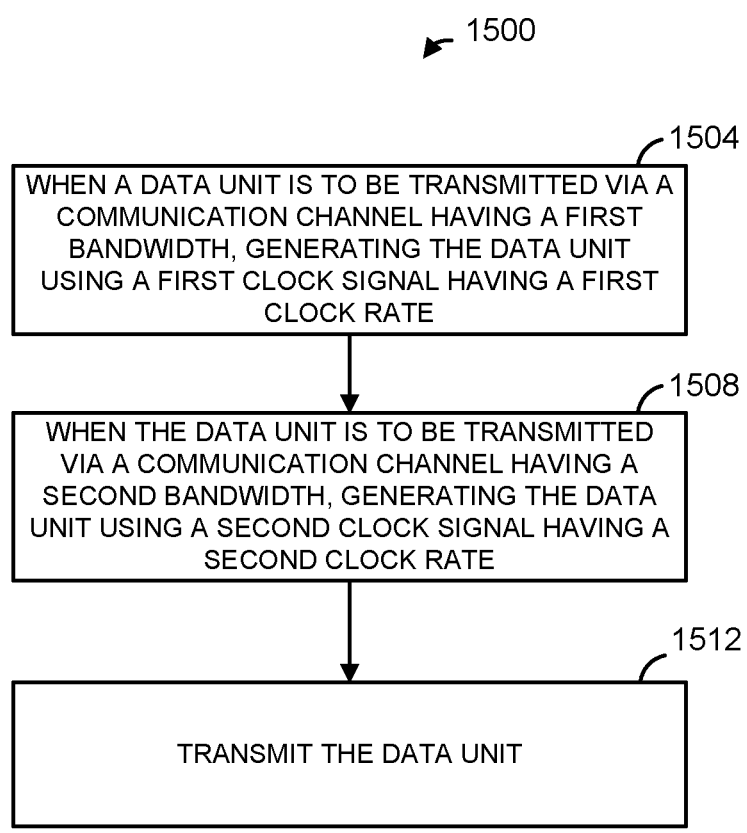
FIG. 15 is a flow diagram of yet another example method, according to yet another embodiment.

FIG. 15 is a flow diagram of an example method 1500, according to an embodiment. With reference to FIG. 1, the method 1500 is implemented by the network interface 16, in some embodiments. For example, in one such embodiment, the PHY processing unit 20 is configured to implement the method 1500. According to another embodiment, the MAC processing unit 18 is also configured to implement at least a part of the method 1500. With continued reference to FIG. 1, in yet another embodiment, the method 1500 is implemented by the network interface 27 (e.g., the PHY processing unit 29 and/or the MAC processing unit 28). In other embodiments, the method 1500 is implemented by other suitable network interfaces.

At block 1504, when a data unit is to be transmitted via a communication channel having a first bandwidth, the data unit is generated using a first clock signal having a first bandwidth. In an embodiment, block 1504 includes generating long range data units at least substantially according to a PHY format (Greenfield or mixed mode) specified by the IEEE 802.11n Standard. In other embodiments, block 1504 includes generating long range data units at least substantially according to a different PHY format specified by a short range communication protocol (e.g., the IEEE 802.11a Standard, the IEEE 802.11ac Standard, etc.) In an embodiment, block 1504 includes generating long range data units for 40 MHz and/or 20 MHz communication channels using the clock rate specified by the corresponding short range communication protocol ("regular short range clock rate").

At block 1508, when a data unit is to be transmitted via a communication channel having a second bandwidth, the data unit is generated using a second clock signal having a second bandwidth. In an embodiment, the second bandwidth is a fraction of the first bandwidth, and the second clock rate is a fraction of the first clock rate. In an embodiment, the second clock signal corresponds to a downclocked version of the first clock signal. In an embodiment, generating the second clock signal includes downclocking the first clock signal.

In an embodiment, block 1508 includes generating long range data units at least substantially according to a PHY format (Greenfield or mixed mode) specified by the IEEE 802.11n Standard. In other embodiments, block 1508 includes generating long range data units at least substantially according to a different PHY format specified by a short range communication protocol (e.g., the IEEE 802.11a Standard, the IEEE 802.11ac Standard, etc.) In an embodiment, block 1508 includes generating long range data units for 10 MHz and/or 5 MHz communication channels using a clock rate that is down clocked from the regular short range clock rate by a down-clocking factor 4 or another suitable factor. In an embodiment in which the downclocking factor is 4, symbol duration of each OFDM symbol of a 5 MHz and/or a 10 MHz data unit (e.g. 16 µs) is four times longer compared to symbol duration of each OFDM symbol of a 20 MHz and/or a 40 MHz data unit (e.g., 4 µs).

In one such embodiment, 5 MHz and 10 MHz long range data units generated using a down-clocked clock rate are used in one region of the sub-GHz frequency spectrum (e.g., in the 156 MHz TV channel spectrum), while 20 MHz and 40 MHz data units generated using a short range communication protocol clock rate are used in a different frequency region (e.g., in the 450 MHz TV channel spectrum). In other embodiments, long range data units generated using different clock rates coexist in the same frequency range. In some such embodiment, various auto-detection techniques, some of which are described previously, are used by a receiving device to determine the particular clock rate used for generating a data unit.

At block 1512, the data unit is transmitted.

In an embodiment, a communication device comprises a network interface configured to transmit. The network interface is configured to generate a data unit using a first clock signal having a first bandwidth when a data unit is to be transmitted via a communication channel having a first bandwidth. The network interface is also configured to generate a data unit using a second clock signal having a second bandwidth when a data unit is to be transmitted via a communication channel having a second bandwidth. The network interface is configured to transmit the data unit, or cause the data unit to be transmitted. The second bandwidth is a fraction of the first bandwidth, and the second clock rate is a fraction of the first clock rate. In an embodiment, the network interface is configured to generate the second clock signal based on downclocking the first clock signal.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

The invention claimed is:

1. A method, comprising:
   determining an available frequency band for communication;
   determining a frequency $f_c$ of a carrier based on the available frequency band;
   communicating with one or more communication devices via a first communication channel within the available frequency band using the carrier set to the frequency $f_c$;
     selecting the first communication channel from a set of communication channels within the available frequency band, the set of communication channels including (i) a first subset of communication channels and (ii) a second subset of at least one communication channel, wherein
       no communication channel in the first subset overlaps with another communication channel in the first subset, and
       a communication channel in the second subset (i) overlaps with at least two communication channels in the first subset, and (ii) has a frequency bandwidth that corresponds to a cumulative bandwidth of the at least two communication channels in the first subset; and
     after communicating via the first communication channel, communicating with one or more communication devices via a second communication channel within the available bandwidth using the carrier set to the frequency $f_c$, wherein a center frequency of the first channel is different than a center frequency of the second channel.

2. A method according to claim 1, wherein a frequency bandwidth of the first channel is different than a frequency bandwidth of the second channel.

3. A method according to claim 1, further comprising determining a frequency $f_{LO}$ of a local oscillator that corresponds to the carrier set to the frequency $f_c$;
   wherein
     communicating via the first communication channel includes using the local oscillator set to the frequency $f_{LO}$ to upconvert to or downconvert from the first communication channel, and
     communicating via the second communication channel includes using the local oscillator set to the frequency $f_{LO}$ to upconvert to or downconvert from the second communication channel.

4. A method according to claim 1, wherein determining the available frequency band for communication comprises determining, within a spectrum allocated for television (TV) signal transmission, one or more TV channel slots in which television signals are not being transmitted.

5. A method according to claim 4, wherein
   communicating via the first communication channel comprises performing two way communication with one or more communication devices via the first communication channel, and
   communicating via the second communication channel comprises performing two way communication with one or more communication devices via the second communication channel.

6. An apparatus, comprising:
   a network interface configured to:
     determine an available frequency band for communication,
     determine a frequency $f_c$ of a carrier based on the available frequency band,
     communicate with one or more communication devices via a first communication channel within the available frequency band using the carrier set to the frequency $f_c$,
     select the first communication channel from a set of communication channels within the available frequency band, the set of communication channels including (i) a first subset of communication channels and (ii) a second subset of at least one communication channel, wherein
       no communication channel in the first subset overlaps with another communication channel in the first subset, and
       a communication channel in the second subset (i) overlaps with at least two communication channels in the first, and (ii) has a frequency bandwidth that corresponds to a cumulative bandwidth of the at least two communication channels in the first subset; and
   wherein the network interface is further configured to, after communicating via the first communication channel, communicate with one or more communication devices via a second communication channel within the available bandwidth using the carrier set to the frequency $f_c$, wherein a center frequency of the first channel is different than a center frequency of the second channel.

7. An apparatus according to claim 6, wherein a frequency bandwidth of the first channel is different than a frequency bandwidth of the second channel.

8. An apparatus according to claim 6, wherein the network interface is configured to
   determine a frequency $f_{LO}$ of a local oscillator that corresponds to the carrier set to $f_c$,
   use the local oscillator set to the frequency $f_{LO}$ to upconvert to or downconvert from the first communication channel, and
   use the local oscillator set to the frequency $f_{LO}$ to upconvert to or downconvert from the second communication channel.

9. An apparatus according to claim 6, wherein the network interface is configured to determine the available frequency band for communication based on determining, within a spectrum allocated for television (TV) signal transmission, one or more TV channel slots in which television signals are not being transmitted.

10. An apparatus according to claim 9, wherein the network interface is configured to
   perform two way communication with one or more communication devices via the first communication channel, and
   perform two way communication with one or more communication devices via the second communication channel.

11. A method, comprising:
   determining an available frequency band for communication;
   determining a frequency $f_{LO}$ of a local oscillator based on the available frequency band;
   communicating with one or more communication devices via a first communication channel within the available frequency band including using the local oscillator set to the frequency $f_{LO}$ to upconvert to or downconvert from the first communication channel;

selecting the first communication channel from a set of communication channels within the available frequency band, the set of communication channels including (i) a first subset of communication channels and (ii) a second subset of at least one communication channel, wherein each communication channel in the first subset is non-overlapping with each other communication channel in the first subset, and a communication channel in the second subset (i) has a bandwidth equal to a cumulative bandwidth of at least two adjacent communication channels in the first subset, and (ii) completely overlaps in frequency with the at least two adjacent communication channels in the first subset; and after communicating via the first communication channel, communicating with one or more communication devices via a second communication channel within the available bandwidth including using the local oscillator set to the frequency $f_{LO}$ to upconvert to or downconvert from the second communication channel, wherein a center frequency of the first communication channel is different than a center frequency of the second communication channel.

12. A method according to claim 11, wherein a frequency bandwidth of the first channel is different than a frequency bandwidth of the second channel.

13. An apparatus, comprising:

a network interface configured to:

determine an available frequency band for communication, determine a frequency $f_{LO}$ of a local oscillator based on the available frequency band, communicate with one or more communication devices via a first communication channel within the available frequency band including using the local oscillator set to the frequency $f_{LO}$ to upconvert to or downconvert from the first communication channel, select the first communication channel from a set of communication channels within the available frequency band, the set of communication channels including (i) a first subset of communication channels and (ii) a second subset of at least one communication channel, wherein each communication channel in the first subset is non-overlapping with each other communication channel in the first subset, and a communication channel in the second subset (i) has a bandwidth equal to a cumulative bandwidth of at least two adjacent communication channels in the first subset, and (ii) completely overlaps in frequency with the at least two adjacent communication channels in the first subset; and wherein the network interface is further configured to, after communicating via the first communication channel, communicate with one or more communication devices via a second communication channel within the available bandwidth including using the local oscillator set to the frequency $f_{LO}$ to upconvert to or downconvert from the second communication channel, wherein a center frequency of the first communication channel is different than a center frequency of the second communication channel.

14. An apparatus according to claim 13, wherein a frequency bandwidth of the first channel is different than a frequency bandwidth of the second channel.

* * * * *